United States Patent [19]

Shirogami et al.

[11] Patent Number: 4,766,043
[45] Date of Patent: Aug. 23, 1988

[54] FUEL CELL

[75] Inventors: Tamotsu Shirogami, Yamato; Mitsushi Ueno, Yokohama, both of Japan

[73] Assignee: Kabushiki Kaisha Toshiba, Kawasaki, Japan

[21] Appl. No.: 9,918

[22] Filed: Feb. 2, 1987

[30] Foreign Application Priority Data

Feb. 3, 1986 [JP] Japan ................... 61-21825

[51] Int. Cl.⁴ .............................. H01M 2/14
[52] U.S. Cl. ...................... 429/39; 429/38; 429/34
[58] Field of Search ................... 429/34-39

[56] References Cited

U.S. PATENT DOCUMENTS

| | | | |
|---|---|---|---|
| 3,994,748 | 11/1976 | Kunz et al. | 429/34 X |
| 4,366,211 | 12/1982 | Pollack | 429/38 |
| 4,383,008 | 5/1983 | Chi | 429/38 |
| 4,383,009 | 5/1983 | Kothmann | 429/39 |
| 4,461,813 | 7/1984 | Shirogami et al. | 429/34 |
| 4,515,871 | 5/1985 | Shirogami et al. | 429/34 |

OTHER PUBLICATIONS

AD-A070 881 "Improvement of Phosphoric Acid Fuel Cell Stacks" p. 27.

EPRI EM-1134 "Integral Cell Scale-Up and Performance Verification" pp. S-1 to S-2.

Primary Examiner—Brian E. Hearn
Assistant Examiner—Stephen J. Kalafut
Attorney, Agent, or Firm—Oblon, Fisher, Spivak, McClelland & Maier

[57] ABSTRACT

In a fuel cell according to the present invention, a plurality of unit cells each includes an anode and a cathode, each formed of a porous substrate, and an electrolyte matrix layer interposed between the anode and the cathode. A fuel gas channel is formed on one surface of the anode that is located on the side opposite to the electrolyte matrix layer, and an electrolyte-solution permeable portion is formed on the same surface of the anode. The unit cells are stacked in layers, and a plurality of separator elements are interposed between the adjacent unit cells to form a stacked structure. Each of the separator elements has a recess formed on its surface that is located on the side facing the anode. The recess serves to store an electrolyte solution and contain the electrolyte-solution permeable portion. Thus, if an electrolyte solution, with which the electrolyte matrix layer is impregnated, is reduced, the solution stored in the recess permeates the matrix layer, flowing through the permeable portion. As a result, the voltage of the fuel cell is prevented from dropping, thus permitting a prolonged continuous operation of the fuel cell.

13 Claims, 7 Drawing Sheets

FIG. 2
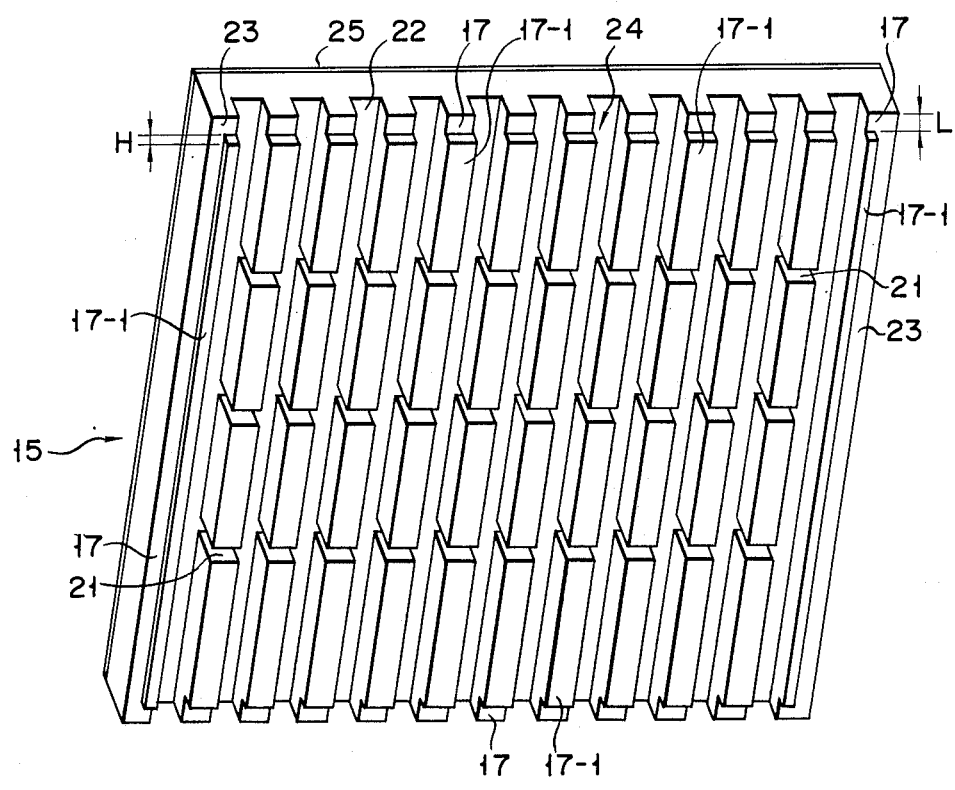
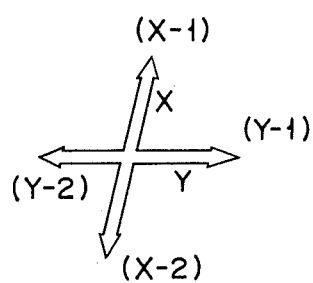

FUEL CELL

BACKGROUND OF THE INVENTION

The present invention relates to a fuel cell, and more specifically, to a fuel cell having an electrolyte matrix layer impregnated with an electrolyte solution (e.g., phosphoric acid solution).

Generally, in fuel cells, an easily oxidizable fuel gas (e.g., hydrogen gas) and an oxidant gas (e.g., oxygen gas) having oxidizing capability are subjected individually to electrode reactions. By these reactions, free energy of Gibbs is released and taken out as electric power. These fuel cells are advantageous in having high power-generation efficiency and in being pollution-free.

One such prior art fuel cell comprises a number of unit cells, for use as minimum generator elements, and separator plates electrically connecting the unit cells. In the fuel cell of this type, the unit cells are stacked in layers, and the separator plates are interposed individually between the adjacent unit cells. This configuration is necessary because a number of unit cells must be arranged in series, in order to enable the fuel cell to produce a high electromotive force, since each unit cell can produce an electromotive force of only 1 V or less.

Each unit cell includes an anode and a cathode, each formed of a porous substrate, and an electrolyte matrix layer interposed between them. The matrix layer is impregnated with an electrolyte solution of a very high concentration, e.g., 95-% phosphoric acid solution. An anode catalyst layer is formed on the matrix-side surface of the anode, while a cathode catalyst layer is formed on the matrix-side surface of the cathode.

The fuel cell is further provided with a fuel gas channel, used to feed the fuel gas to the anode, and an oxidant gas channel through which the oxidant gas is fed to the cathode. Depending on the locations of these channels, fuel cells are generally classified into the following three types. A first one is a so-called bipolar type, in which a fuel gas channel and an oxidant gas channel are formed individually in two opposite surfaces of a separator plate. A second one is a so-called ribbed-substrate type, in which a fuel gas channel is formed in the separator-side surface of an anode, and an oxidant gas channel is formed in the separator-side surface of a cathode. A third one is a so-called hybrid type, in which a fuel gas channel is formed in the separator-side surface of an anode, and an oxidant gas channel is formed in the cathode-side surface of a separator. Fuel cells of the hybrid type are commonly used, in view of the strength of the stacked structure and the ease of diffusion of the oxidant gas.

If the fuel gas and oxidant gas are delivered to the anode and cathode in each unit cell, and brought into contact with the anode and cathode catalyst layers, respectively, the following electrode reactions take place:

    (1)

on the anode side, and

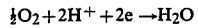    (2)

on the cathode side. During these reactions, H+ in the electrolyte solution, with which the electrolyte matrix layer is impregnated, functions as a medium for charge transfer.

After the electrode reactions, the fuel and oxidant gases are discharged through their respective channels. With the progress of the electrode reaction, as indicated by formula (2), water is produced. The water tends to lower the concentration of the electrolyte solution. In order to prevent the concentration reduction, the water is discharged quickly with the oxidant gas. At the same time, however, some of the electrolyte solution is discharged, so that the solution in the electrolyte matrix layer is reduced. Thus, the matrix layer increases its resistance, thereby lowering the voltage of the fuel cell.

In the prior art fuel cells, therefore, if the electrolyte solution is reduced, the electrolyte matrix layer is replenished with electrolyte solution, to prevent the fuel cell voltage from dropping.

In the fuel cells of the popular hybrid type, the fuel gas channel of the anode is defined by a plurality of porous ribs, which have been previously impregnated with the electrolyte solution. If the electrolyte solution in the electrolyte matrix layer lessens, the solution in the ribs is delivered to the matrix layer, after permeating the porous anode. Thus, the matrix layer is replenished with the electrolyte solution, thereby maintaining the quantity of the solution therein, so that the voltage of the fuel cell is prevented from dropping. If all the voids of the porous anode are filled up with the electrolyte solution, however, the fuel gas cannot reach its reaction point. Accordingly, the electrolyte solution is reserved only in about 60% of the voids of the anode. In the conventional fuel cells, therefore, the electrolyte solution cannot be resupplied to a level high enough to permit a continuous operation of the fuel cell for 40,000 hours, which is a commercial power-generating time.

Moreover, a bank portion is formed on either side of the fuel gas channel of the anode. It is formed with a channel, capable of storing an electrolyte solution, for use as an alternative solution resupply means. During operation of the fuel cell, the electrolyte solution in this channel permeates the electrolyte matrix layer, so that the matrix layer is replenished. Since the bank portion is relatively small, the channel can store only a relatively small quantity of electrolyte solution. Thus, in the prior art fuel cells, as in the aforementioned case, the electrolyte solution cannot be resupplied to the level for a continuous operation for the commercial power generating time, 40,000 hours.

In replenishing the channel with the electrolyte solution, furthermore, the stacked structure must be disassembled. Therefore, the maintenance of the fuel cell requires much time.

SUMMARY OF THE INVENTION

The object of the present invention is to provide a fuel cell which can be replenished easily with an electrolyte solution, for a prolonged continuous operation.

In a fuel cell according to the present invention, a plurality of unit cells each includes an anode and a cathode, each formed of a porous substrate, and an electrolyte matrix layer interposed between the anode and the cathode. The anode has an anode catalyst layer formed on its one surface that is located on the side of the electrolyte matrix layer, and a fuel gas channel formed on its other surface that is located on the opposite side to the electrolyte matrix layer. An electrolyte-solution permeable portion is formed on the other surface of the anode. The cathode has a cathode electrolyte layer formed on its one surface that is located on the side of the electrolyte matrix layer. The unit cells are stacked in layers, and a plurality of separator elements are interposed between the adjacent unit cells to form a stacked structure. Each of the separator element has a recess formed in the anode-side surface thereof. The recess serves to store an electrolyte solution and contain the electrolyte-solution permeable portion. Thus, the recess in the separator element is provided with a necessary quantity of electrolyte solution for a prolonged continuous operation of the fuel cell. In this arrangement, if an electrolyte solution, with which the electrolyte matrix layer is impregnated, is reduced, the solution stored in the recess is fed to the matrix layer through the permeable portion. As a result, the electrolyte matrix layer is replenished with the electrolyte solution, thereby maintaining the quantity of the solution therein, so that the voltage of the fuel cell is prevented from dropping. Thus, the fuel cell can be operated continuously for a long time.

BRIEF DESCRIPTION OF THE DRAWINGS

FIG. 2 is a perspective view, as taken from the bottom side, showing an anode constituting the stacked structure of FIG. 1;

DETAILED DESCRIPTION OF THE PREFERRED EMBODIMENTS

Figure 1:
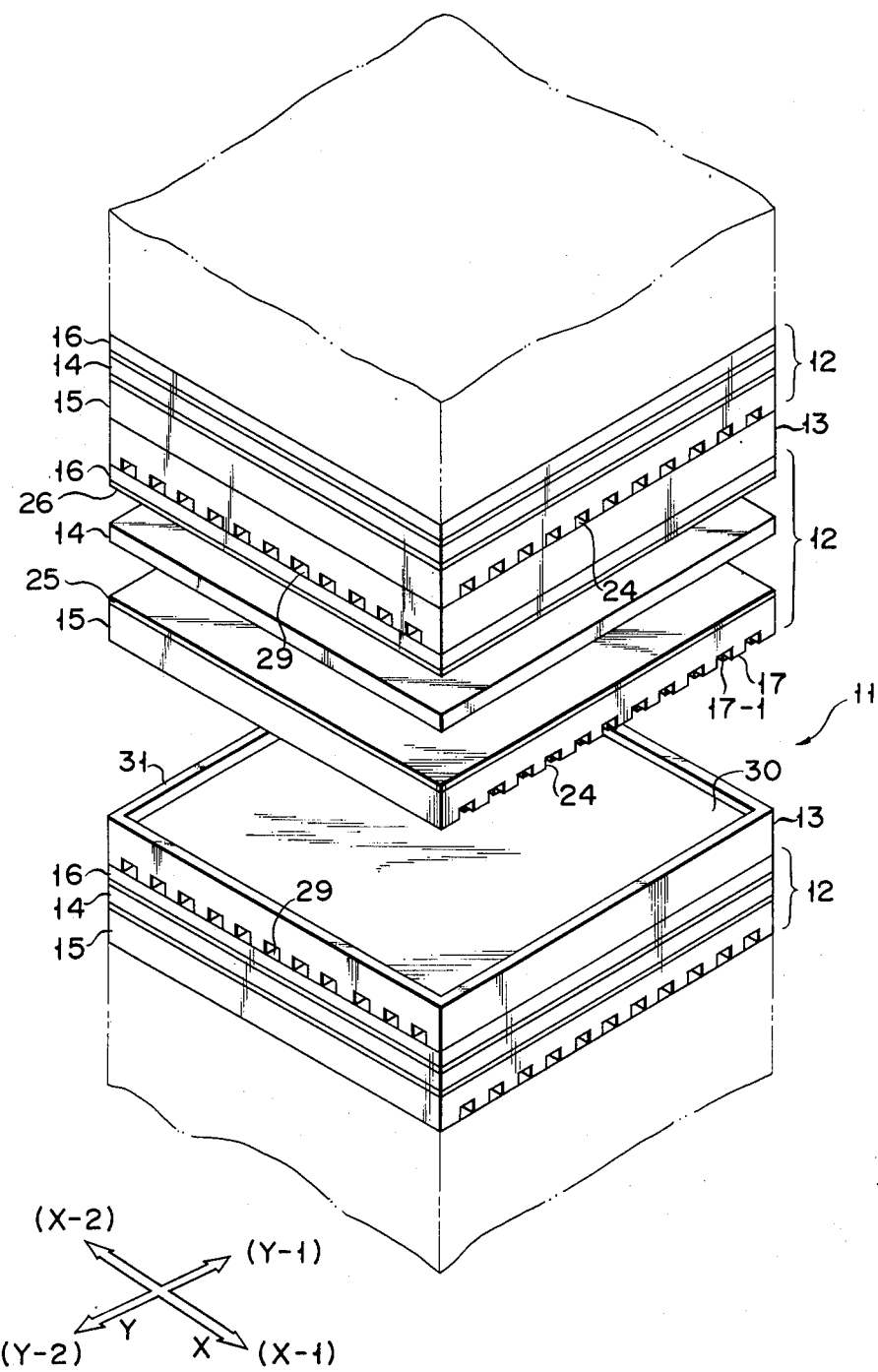
FIG. 1 is an exploded perspective view of a stacked structure constituting a fuel cell according to the present invention.

As shown in FIG. 1, stacked structure 11, constituting a fuel cell, comprises unit cells 12, as minimum generator elements, and separator plates 13 for electrically connecting cells 12. In structure 11, cells 12 are stacked in layers, and one separator plate 13 is interposed between each two adjacent cells 12. The fuel cell of FIG. 1 is of the so-called hybrid type. In FIGS. 1 to 7, arrows X (X-1, X-2) and Y (Y-1, Y-2) indicate specific directions of stacked structure 11, for the ease of illustration of embodiments of the invention.

Each unit cell 12 includes electrolyte matrix layer 14, anode 15 disposed in intimate contact with the lower surface of layer 14, and cathode 16 in intimate contact with the upper surface of layer 14.

Matrix layer 14 is formed of a kneaded mixture of silicon-carbide powder, with particle diameter of 3 to 5 $\mu$m, and 6%, by weight, of polytetrafluoroethylene. Layer 14 is impregnated with an electrolyte solution, e.g., 95-% phosphoric acid solution.

Anode 15 is formed of a porous carbon substrate shaped like a flat plate. As shown in FIG. 2, a plurality of first ribs 17, extending in the X-direction, are formed on the lower surface of anode 15. Second ribs 17-1, extending in the X-direction, are formed on the respective top faces of ribs 17. Ribs 17-1 are housed in recess 30 (mentioned later) of each separator plate 13, and are permeated with the electrolyte solution. Thus, the second ribs constitute an electrolyte-solution permeable portion, through which the solution is supplied to electrolyte matrix layer 14. The top faces of first ribs 17 are formed with stepped portion 23, extending along the periphery of anode 15. Grooves 22, formed between ribs 17, define fuel gas channel 24. Those first and second ribs 17 and 17-1 located in the center of anode 15 are formed with communication channels 21, which connect adjacent grooves 22. Anode catalyst layer 25 is formed on that surface of anode 15 on the side of matrix layer 14.

Anode 15 is formed of a porous carbon substrate whose bulk specific gravity ranges from 0.50 to 0.55. Anode catalyst layer 25 is formed of a kneaded mixture of catalyst powder, including fine particles of furnace black and 3%, by weight, of platinum black, educed thereon, and 8%, by weight, of polytetrafluoroethylene suspension. The mixture is coated on the matrix-side surface of anode 15. A 30-% suspension of polytetrafluoroethylene is sprayed on the inner surface of fuel gas channel 24 or those of grooves 22, at a rate of 5 to 10 mg per unit area, and is then dried. The dried suspension is heated at 340° C. for 5 minutes, for waterproofing. Fluorine-contained elastomer is applied to the separator-side surface of anode 15, in order to prevent oxidant gas from mixing with the fuel cell.

Cathode 16 is formed of porous graphitized carbon paper, having a bulk specific gravity of 0.42 to 0.45. The carbon paper is impregnated with a 30-% suspension of polytetrafluoroethylene, for waterproofing. Further, it is dried and sintered at 320° C. for 10 minutes. Cathode 16 has cathode catalyst layer 26 formed on its one surface that is located on the side of electrolyte matrix layer 14. Layer 26 is formed of a kneaded mixture of catalyst powder with particle diameter of 3 to 5 $\mu$m, including fine particles of carbon and 10%, by weight, of platinum black, educed thereon, and 8%, by weight, of polytetrafluoroethylene suspension. The mixture is applied to the matrix-side surface of cathode 16.

Separator plate 13 is formed of a powdered mixture of natural graphite powder with a mean particle diameter of about 10 $\mu$m, synthetic graphite, novolac phenol resin, and hexamethylene amine. The mixed powder is heated to a high temperature, and formed into a properly shaped member with density of 1.8 to 1.9.

Figure 3:
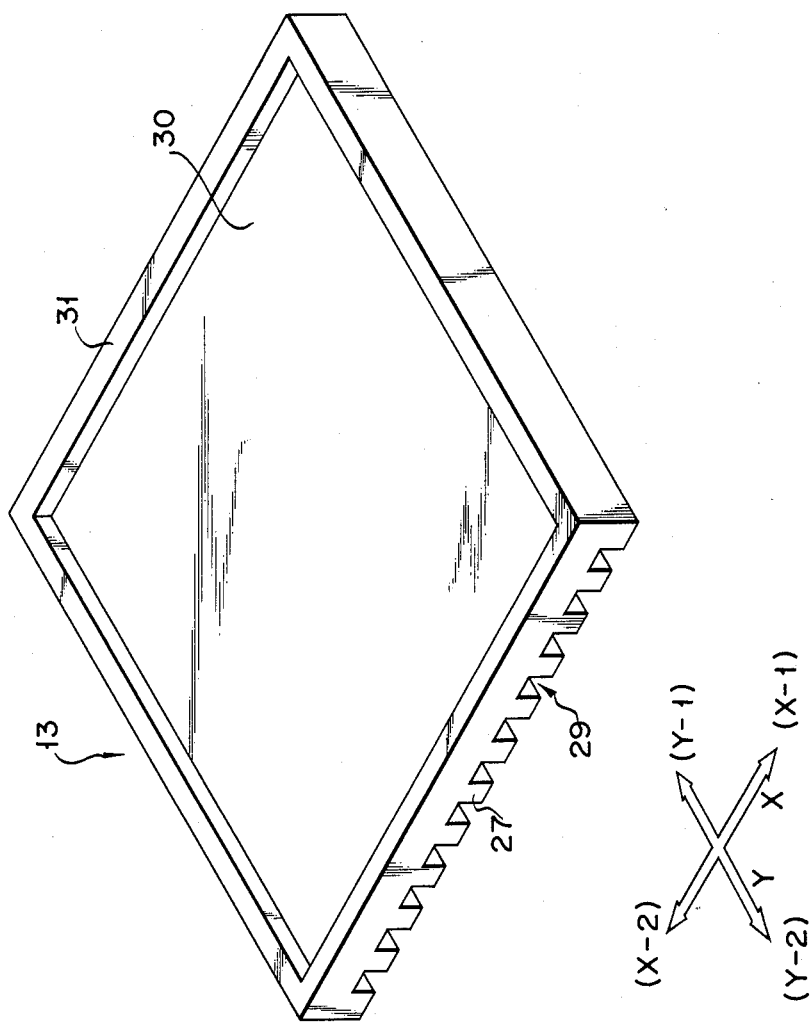
FIG. 3 is a perspective view, as taken from the top side, showing a separator plate constituting the stacked structure of FIG. 1.

As shown in FIG. 3, moreover, a plurality of ribs 27, extending in the Y-direction, are formed on the cathode-side surface of separator plate 13. Grooves formed individually between ribs 27 define oxidant gas channel 29, which extends at right angles to fuel gas channel 24. Formed on the anode-side surface of plate 13 is recess 30, in which the electrolyte solution is stored. Bank portion 31 is formed along the periphery of recess 30. When unit cell 12 and separator plate 13 are joined together, second ribs 17-1 of anode 15 are fitted in recess 30. In this state, the respective top faces of ribs 17-1 are in contact with the bottom surface of recess 30. At the same time, stepped portion 23 of anode 15 is in intimate contact with the top surface of bank portion 31.

Figure 4:
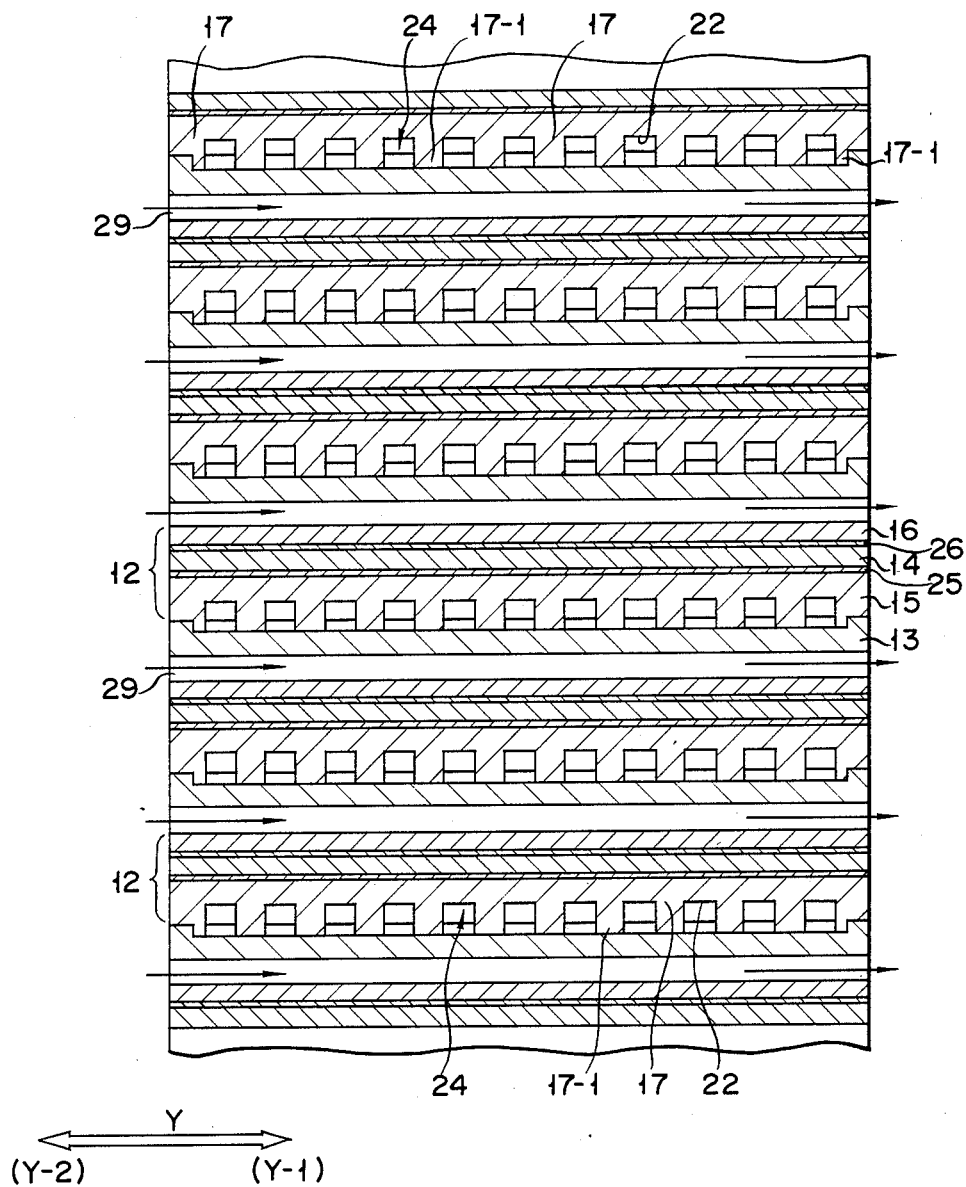
FIG. 4 is a sectional view of the stacked structure shown in FIG. 1.

Unit cells 12 and separator plates 13 are stacked in layers, in the following manner, thus constituting stacked structure 11. Fifty percent of the voids of first and second ribs 17 and 17-1 of anode 15 are impregnated with the electrolyte solution (i.e., 95-% phosphoric acid solution). Anode 15 is laid on top of separator plate 13 so that ribs 17-1 are fitted in recess 30. In this state, fuel gas channel 24 of anode 15 is arranged at right angles to oxidant gas channel 29 of plate 13. Electrolyte matrix layer 14 and cathode 16 are arranged on the upper surface of anode 15. In this manner, unit cells 12 are formed by lamination, and separator plate 13 is interposed between each two adjacent cells 12. Thus, stacked structure 11 is completed, as shown in FIGS. 1 and 4.

In stacked structure 11, the electrolyte solution or 95-% phosphoric acid solution is injected through fuel gas channel 24 into recess 30, at a rate of 0.03 cc/cm². The injected solution spreads all over recess 30 through communication channels 21 in first and second ribs 17 and 17-1. A specific region of structure 11 is sealed. A fuel gas manifold (not shown), used to supply fuel gas, is attached to the (X-1)-side face of structure 11. Likewise, an oxidant gas manifold (not shown), used to supply oxidant gas, is attached to the (Y-2)-side face of structure 11.

Constructed in this manner, the fuel cell produces electric power as follows. As shown in FIG. 4, the fuel gas, supplied from the fuel gas manifold, advances in fuel gas channel 24. Since anode 15 is porous, the fuel gas is guided through anode 15, thus reaching anode catalyst layer 25, whereupon it undergoes an electrode reaction. After the reaction, the fuel gas flows in the direction of arrow X-2, to be discharged through an exhaust manifold.

Meanwhile, the oxidant gas, supplied from the oxidant gas manifold, advances in oxidant gas channel 29. Since cathode 16 is porous, the oxidant gas is guided through cathode 16, thus reaching cathode catalyst layer 26, whereupon it undergoes an electrode reaction. After the reaction, the oxidant gas flows in the direction of arrow Y-2, to be discharged through the exhaust manifold.

Water is produced during the electrode reactions, and it is discharged together with unaffected oxidant gas. At the same time, some of the electrolyte solution is discharged with the generated water. Thus, the electrolyte solution in electrolyte matrix layer 14 lessens. The electrolyte solution stored in first and second ribs 17 and 17-1 is fed to layer 14 through porous anode 15. If the solution in anode 15 is reduced, the electrolyte solution stored in recess 30 of separator plate 13 permeates second ribs 17-1 of anode 15. This solution is fed to layer 14 through first ribs 17. In this manner, matrix layer 14 is replenished with the electrolyte solution, thereby maintaining the quantity of the solution therein, so that the voltage of the fuel cell is prevented from dropping. Thus, the fuel cell can be operated continuously for a long time. Moreover, the electrolyte solution can be filled into recess 30 with only the manifolds removed from the fuel cell, without disassembling the stacked structure. Accordingly, the maintenance of the fuel cell is easy.

Products according to the present invention were made on an experimental basis, and were tested.

These products have the following measurements. Electrolyte matrix layer 14 is 0.3 mm thick, 600 mm wide, and 600 mm long. Anode 15 is 1.8 mm thick 600 mm wide, and 600 mm long. Grooves 22, defining fuel gas channel 24, have a width of 1.6 mm and a depth of 1.3 mm, and are arranged at pitches of 3 mm in the Y-direction. Width L of stepped portion 23 is 30 mm, and height H of second ribs 17-1 is 0.5 mm. Cathode 16 is 0.4 mm thick, 600 mm wide, and 600 mm long. Separator plate 13 is 3 mm thick, 600 mm wide, and 600 mm long.

Figure 5:
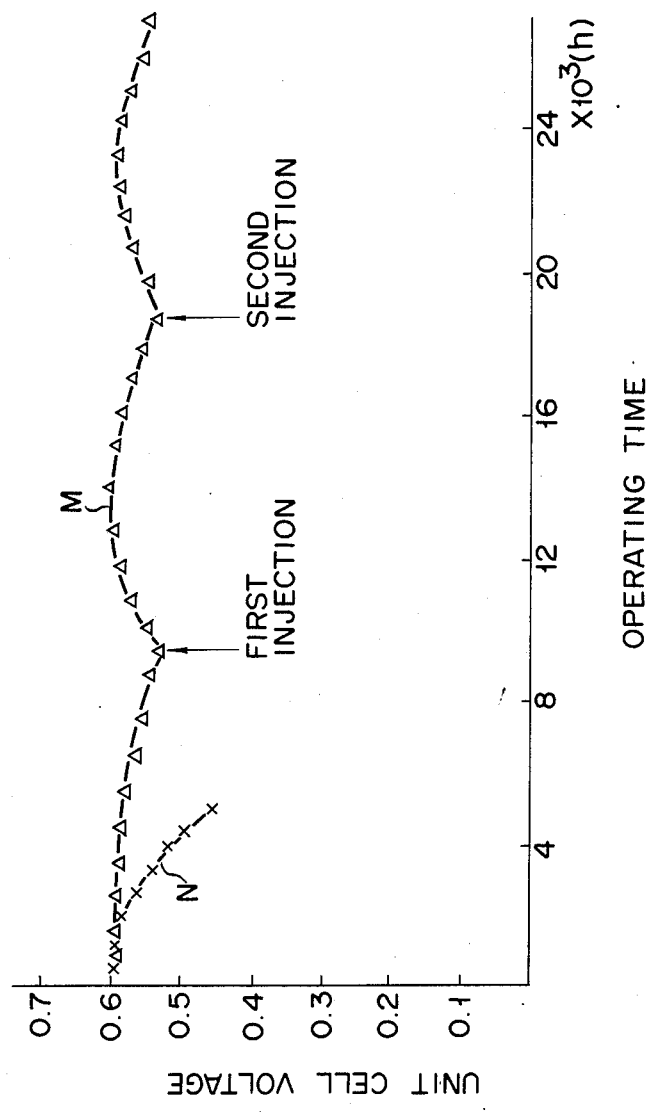
FIG. 5 is a graph showing the relationship between unit cell voltage and operating time, obtained as a result of experiments on a fuel cell according to the invention and a prior art fuel cell.

A fuel cell of this configuration and a conventional hybrid-type fuel cell were operated at 205° C. and 220 mA/cm². In FIG. 5, curve M represents the characteristic of unit cells according to the embodiment of the invention, while curve N indicates the characteristic of prior art unit cells. As seen from FIG. 5, after prolonged operation, the voltage of the unit cells of the invention dropped much less than that of the prior art unit cells did. After 8,000 hours of operation, the unit cell voltage dropped a little. In this case, the operation of the fuel cell was stopped temporarily, an electrolyte solution was resupplied to recess 30 of separator plate 13 in the amount of 0.02 to 0.04 cc/cm². As a result, stable electrode reactions were resumed in the unit cells. The effect of the replenishment was noticed several times, as shown in FIG. 5.

Figure 6:
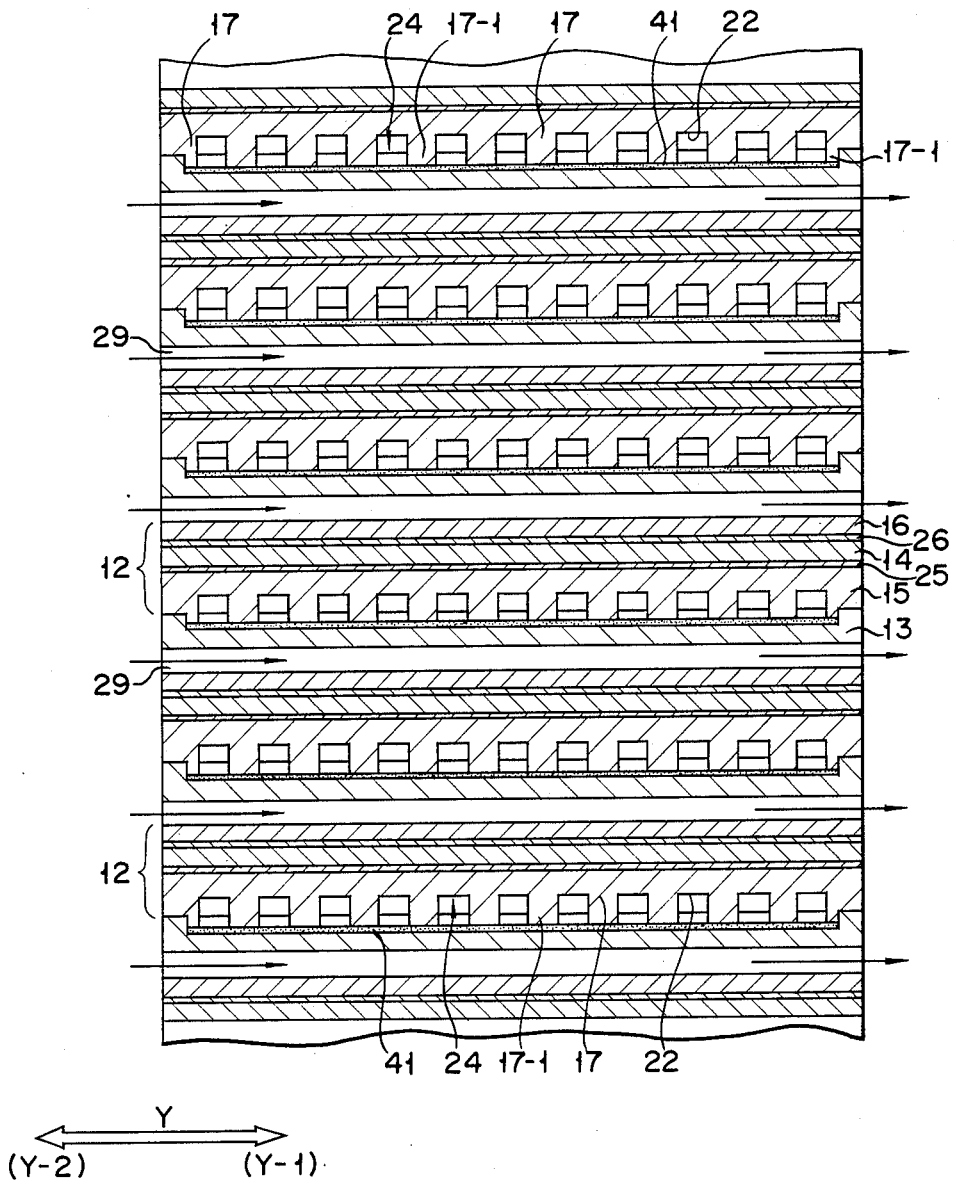
FIG. 6 is a sectional view of a stacked structure constituting a fuel cell according to a second embodiment of the invention.

Referring now to FIG. 6, a second embodiment of the present invention will be described. In a stacked structure of this embodiment, carbon paper 41 is interposed between the respective top faces of second ribs 17-1 of anode 15 and the bottom surface of recess 30 of separator plate 13. Paper 41 has a thickness of 0.2 to 0.3 mm and a porosity of about 80%. It is highly resistant to acid and heat, and has good electrical conductivity and some elasticity. Therefore, an electrolyte solution can be stored satisfactorily in the carbon paper. Also, the contact between anode 15 and separator plate 13 is improved, thus ensuring higher conductivity.

Figure 7:
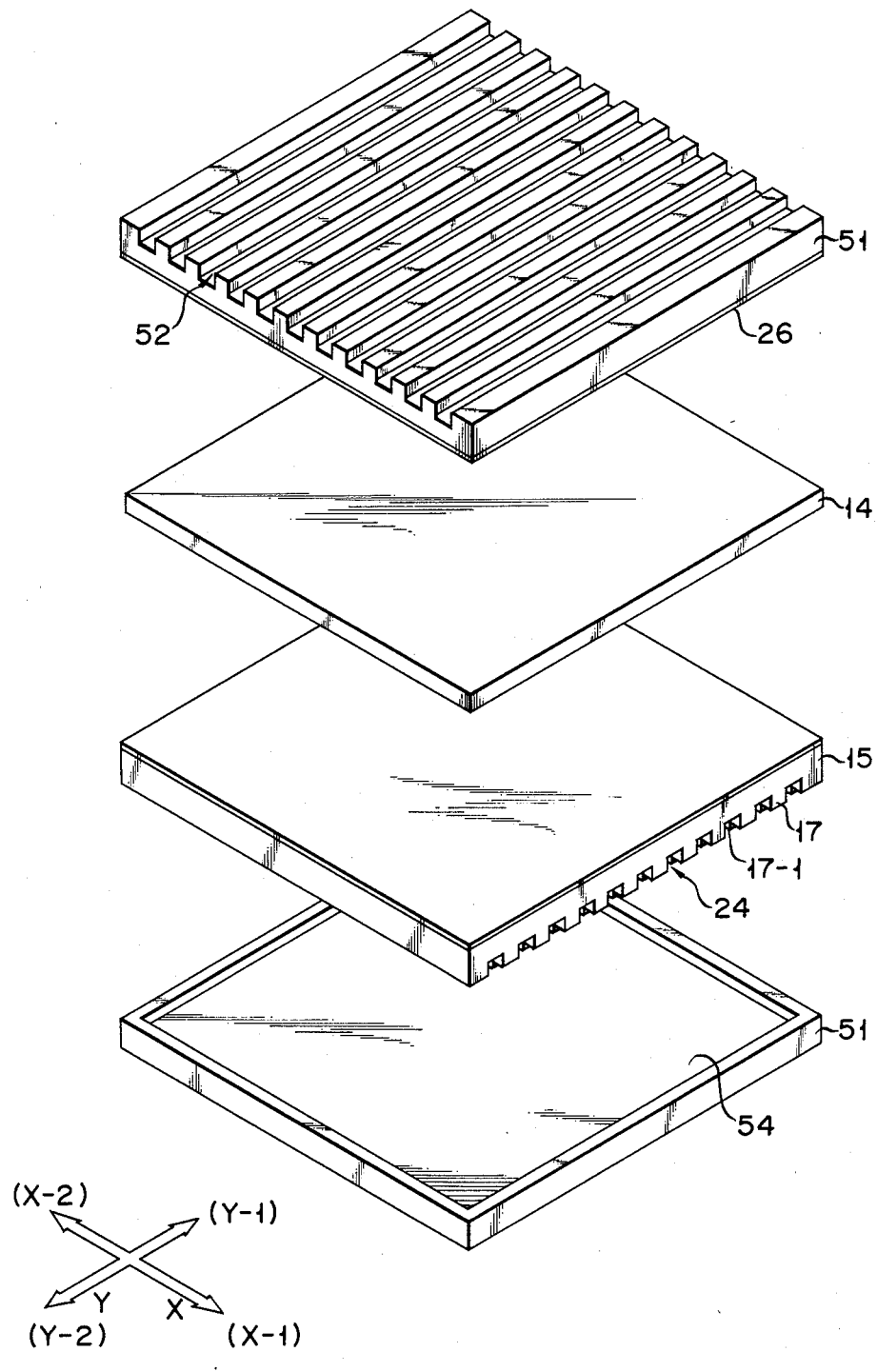
FIG. 7 is an exploded perspective view of the stacked structure according to a third embodiment of the invention.

Referring now to FIG. 7, a third embodiment of the present invention will be described. A fuel cell of this embodiment is of the ribbed-substrate type. In this case, cathode 51 is formed with oxidant gas channel 52, and separator plate 53 is formed with recess 54. The fuel cell, comprising a plurality of unit cells and separator plates 53, is operated in the same manner as in the first embodiment. An electrolyte solution stored in recess 54 is supplied to electrolyte matrix layer 14.

The present invention is not limited to the embodiments described above. For example, the separator plate may be formed of a carbon plate, which is prepared by binding graphite powder with coal-tar pitch and sintering it, and then impregnating the resulting structure with resor-type phenol resin. The carbon plate, which is highly impermeable to gas, serves to further prevent the fuel gas from mixing with the oxidant gas.

What is claimed is:

1. A fuel cell comprising:
    a plurality of unit cells stacked in layers, each including an anode and a cathode, each formed of a porous substrate, and an electrolyte matrix layer interposed between the anode and the cathode; and
    a plurality of separator elements formed of a conductive material, and interposed between the adjacent unit cells to form a stacked structure,
    said anode including: (a) an anode catalyst layer formed on its one surface that is located on the side of the electrolyte matrix layer; (b) a plurality of ribs formed in substantially the entire area of that surface that is located on the side of the separator element, said ribs being formed as a result of using said porous substrate and each having a tip end portion; and (c) a plurality of grooves each defined between adjacent ones of said ribs and having an inner surface, said cathode including a cathode catalyst layer formed on its one surface that is located on the side of the electrolyte matrix layer, said separator element including: (a) a recess formed in substantially the entire area of its one surface that is located on the side of the anode; and (b) an oxidant gas channel, formed on its other surface that is located on the side of the cathode, for supplying an oxidant gas to the cathode, said recess being adapted for storing an electrolyte solution and receiving the ribs of said anode, the distance from the bottom of the recess to the inner surfaces of the grooves, facing the bottom of the recess, being greater than the depth of the recess, said tip end portion of each rib being immersed in the electrolyte solution when the electrolyte solution is present, and a space formed between the inner surface of the groove and the level of the electrolyte solution serving as a fuel gas channel used for supplying a fuel gas to the anode, whereby the electrolyte solution in said recess soaks through both the ribs and the anode and is supplied to the electrolyte matrix layer.

2. The fuel cell according to claim 1, wherein said fuel gas channel and said oxidant gas channel are arranged at right angles to each other.

3. The fuel cell according to claim 1, wherein said anode comprises a communication channel through which adjacent ones of said grooves communicate with each other.

4. The fuel cell according to claim 1, wherein said recess has a bottom surface, which is in contact with the tip end portions of the ribs.

5. The fuel cell according to claim 1, wherein the inner surface of said groove is waterproof.

6. The fuel cell according to claim 4, wherein said unit cell includes a porous carbon sheet interposed between the bottom surface of the recess and the tip end portions of the ribs.

7. The fuel cell according to claim 1 wherein an electrolyte solution is present in the recess formed in each said separator element into which solely the tip end portion of each rib formed in the said anode is submerged, the fuel cell being oriented so that each anode is above the recess which receives the anode ribs.

8. A fuel cell comprising:

a plurality of unit cells stacked in layers, each including an anode and a cathode, each formed of a porous substrate, and an electrolyte matrix layer interposed between the anode and the cathode; and a plurality of separator elements formed of a conductive material, and interposed between the adjacent unit cells to form a stacked structure, said anode including: (a) an anode catalyst layer formed on its one surface that is located on the side of the electrolyte matrix layer; (b) a plurality of ribs formed in substantially the entire area of that surface that is located on the sides of the separator element, said ribs being formed as a result of using said porous substrate and each having a tip end portion; and (c) a plurality of grooves each defined between adjacent ones of said ribs and having an inner surface, said cathode including: (a) a cathode catalyst layer formed on its one surface that is located on the side of the electrolyte matrix layer, (b) an oxidant gas channel, formed on its other surface that is located on the side of said separator element, for supplying an oxidant gas to the cathode, said separator element including: a recess formed in substantially the entire area of its one surface that is located on the side of the anode, the distance from the bottom of the recess to the inner surfaces of the grooves, facing the bottom of the recess, being greater than the depth of the recess, said recess being adapted for storing an electrolyte solution and receiving the ribs of said anode, said tip end portion of each rib being immersed in the electrolyte solution when the electrolyte solution is present, and a space formed between the inner surface of the groove and the level of the electrolyte solution serving as a fuel gas channel used for supplying a fuel gas to the anode, whereby the electrolyte solution in said recess soaks through both the ribs and the anode and is supplied to the electrolyte matrix layer.

9. The fuel cell according to claim 8, wherein said fuel gas channel and said oxidant gas channel are arranged at right angles to each other.

10. The fuel cell according to claim 8, wherein said anode comprises a communication channel through which adjacent ones of said grooves communicate with each other.

11. The fuel cell according to claim 8, wherein said recess has a bottom surface, which is in contact with the tip end portions of the ribs.

12. The fuel cell according to claim 11, wherein said unit cell includes a porous carbon sheet interposed between the bottom surface of the recess and the tip end portions of the ribs.

13. The fuel cell according to claim 8 wherein an electrolyte solution is present in the recess formed in each said separator element into which solely the tip end portion of each rib formed in the said anode is submerged, the fuel cell being oriented so that each anode is above the recess which receives the anode ribs.

* * * * *